US011708961B1

(12) United States Patent
Miller

(10) Patent No.: US 11,708,961 B1
(45) Date of Patent: Jul. 25, 2023

(54) LED MARKER WITH SINGLE HIGH LUMEN LED LIGHT

(71) Applicant: Buyers Products Company, Mentor, OH (US)

(72) Inventor: Michael Miller, Brunswick, OH (US)

(73) Assignee: BUYERS PRODUCTS COMPANY, Mentor, OH (US)

(*) Notice: Subject to any disclaimer, the term of this patent is extended or adjusted under 35 U.S.C. 154(b) by 0 days.

(21) Appl. No.: 17/736,391

(22) Filed: May 4, 2022

(51) Int. Cl.
| | |
|---|---|
| *F21V 3/04* | (2018.01) |
| *F21V 23/00* | (2015.01) |
| *F21V 21/00* | (2006.01) |
| *E01H 5/06* | (2006.01) |
| *F21V 15/015* | (2006.01) |
| *F21Y 115/10* | (2016.01) |

(52) U.S. Cl.
CPC ............. *F21V 3/049* (2013.01); *E01H 5/061* (2013.01); *F21V 15/015* (2013.01); *F21V 21/00* (2013.01); *F21V 23/002* (2013.01); *F21Y 2115/10* (2016.08)

(58) Field of Classification Search
CPC .... B60Q 1/32; B60Q 2800/20; B60Q 1/2657; B60Q 1/2661; B60Q 1/2696; B60Q 1/305; B60Q 1/30; B60Q 1/26; F21V 3/049; F21V 15/15; F21V 21/00; F21V 23/002; F21V 43/237; E01H 5/061
See application file for complete search history.

(56) References Cited

U.S. PATENT DOCUMENTS

| | | | | |
|---|---|---|---|---|
| 2,636,109 A | * | 4/1953 | Cone ................... | B60Q 1/2657 362/546 |
| 4,054,302 A | * | 10/1977 | Campbell .............. | B60Q 1/305 116/28 R |
| 5,299,773 A | * | 4/1994 | Bertrand ................ | G09F 17/00 248/292.12 |
| 5,379,197 A | * | 1/1995 | Conyers ................... | B62J 6/26 340/432 |
| 5,826,966 A | * | 10/1998 | Schwing .............. | B60Q 1/2657 362/800 |
| 6,328,462 B1 | * | 12/2001 | De La Rosa ......... | B60R 1/1207 362/217.05 |

(Continued)

FOREIGN PATENT DOCUMENTS

EP          0576142 A2 * 12/1993

*Primary Examiner* — Erin Kryukova
(74) *Attorney, Agent, or Firm* — Emerson, Thomson & Bennett, LLC; Roger D. Emerson

(57) ABSTRACT

Provided in this disclosure is an apparatus for marking an implement, such as a snow plow. An elongated tubular member retains an illuminated member such a high lumen LED lighting element mounted substantially adjacent to the bottom end of the elongated tubular member and configured to shine light through the interior of the elongated tubular member toward the top end. Conductor wiring connects a source of electrical energy to the LED. An enclosing cap includes a crimped end portion secured to the bottom end of the elongated tubular member. A cylindrical end portion has a hollow interior for admitting the conductor wiring for connection to the source of electrical energy. A mounting bracket can include a first mounting surface and a second mounting surface, formed together to support the illuminated member.

9 Claims, 2 Drawing Sheets

(56) References Cited

U.S. PATENT DOCUMENTS

| | | | | |
|---|---|---|---|---|
| 6,341,794 | B1* | 1/2002 | Hunter | B60D 1/065 |
| | | | | 116/28 R |
| 6,371,633 | B1* | 4/2002 | Davis | B60Q 1/2657 |
| | | | | 362/540 |
| 6,464,380 | B1* | 10/2002 | Young, Jr. | B60Q 1/2657 |
| | | | | 362/543 |
| 7,486,859 | B2* | 2/2009 | Oney | G02B 6/0006 |
| | | | | 385/39 |
| 9,902,312 | B1* | 2/2018 | Buechs | E01H 5/061 |
| 11,110,855 | B1* | 9/2021 | Buechs | B60Q 1/50 |
| 2002/0044452 | A1* | 4/2002 | Wang | B60Q 1/2657 |
| | | | | 362/540 |
| 2009/0051177 | A1* | 2/2009 | Wang | B60Q 1/2657 |
| | | | | 293/117 |
| 2014/0092612 | A1* | 4/2014 | Freiser | B62J 6/045 |
| | | | | 362/486 |
| 2016/0319503 | A1* | 11/2016 | Westman | B60Q 1/32 |

* cited by examiner

LED MARKER WITH SINGLE HIGH LUMEN LED LIGHT

I. BACKGROUND

A. Technical Field

This invention generally pertains to the field of visible markers for equipment. This invention particularly pertains to the field of illuminated markers for defining the edges of snow plows mounted on the ends of vehicles, such as a truck.

B. Description of Related Art

Plows are most often used as a quick and efficient way to clear away snow, mud or debris, particularly for widespread use in plowing snow. When operating in darkness, the plow driver has to be constantly aware of the projected path of the plow blade relative to a curb placement, parked cars and other objects in the general path of the blade. Currently, it is known to have an illuminated plow marker mounted on top of the plow blade at each end to allow the driver to get some idea of the extent to which the plow blade will clear an object. Illumination makes it easier to see the markers in the dark and in poor visibility conditions, such as ice or snow. An example of such a plow marker is disclosed in U.S. Pat. No. 9,902,312.

Such prior art illuminated markers suffer from certain drawbacks. Such illuminated markers are mounted in locations that expose them to damage from snow and ice. FIG. 1 of the aforementioned U.S. Pat. No. 9,902,312 shows markers mounted on a horizontal wing secured to the top of the plow. Such markers include a strip having a plurality of LED elements retained within the hollow tubular body of the marker. However, such elements can become individually damaged from the snow and ice spilling over the end of the horizontal wing, resulting in uneven marking of the ends of the snow plow. Also, the individual LED elements may not provide sufficient illumination to ensure adequate visibility of the marker in extreme snow conditions.

II. SUMMARY

Provided in this disclosure is an apparatus for marking an implement such as a snow plow. An elongated tubular member has top and bottom ends for transmitting light from its interior. A high lumen LED lighting element is mounted substantially adjacent to the bottom end of the elongated tubular member and configured to shine light through the interior of the elongated tubular member toward the top end. Conductor wiring connects a source of electrical energy to the elongated illuminated member. An enclosing cap including a crimped end portion is secured to the bottom end of the elongated tubular member. The enclosing cap also includes a cylindrical end portion having a hollow interior for admitting the conductor wiring for connection to the source of electrical energy. A mounting bracket includes a first mounting surface connected to the cylindrical end portion of the enclosing cap so that the elongated tubular member is disposed in a substantially vertical position. The mounting bracket also includes a second mounting surface configured for connecting to the implement.

According to an aspect, the present invention can include a lighting system that provides sufficient illumination to ensure adequate visibility of the marker in extreme snow conditions.

According to another aspect, the present invention can provide a lighting system with a single light source in a location secure from buffeting by snow and ice.

According to yet another aspect, the present invention can provide a bright light source note prone to failure of individual elements of a light source having a plurality of light sources.

Other benefits and advantages of this invention will become apparent to those skilled in the art to which it pertains upon reading and understanding of the following detailed specification.

III. BRIEF DESCRIPTION OF THE DRAWINGS

The disclosed marker may take physical form in certain parts and arrangement of parts, embodiments of which will be described in detail in this specification and illustrated in the accompanying drawings which form a part hereof and wherein.

IV. DETAILED DESCRIPTION

Figure 1:
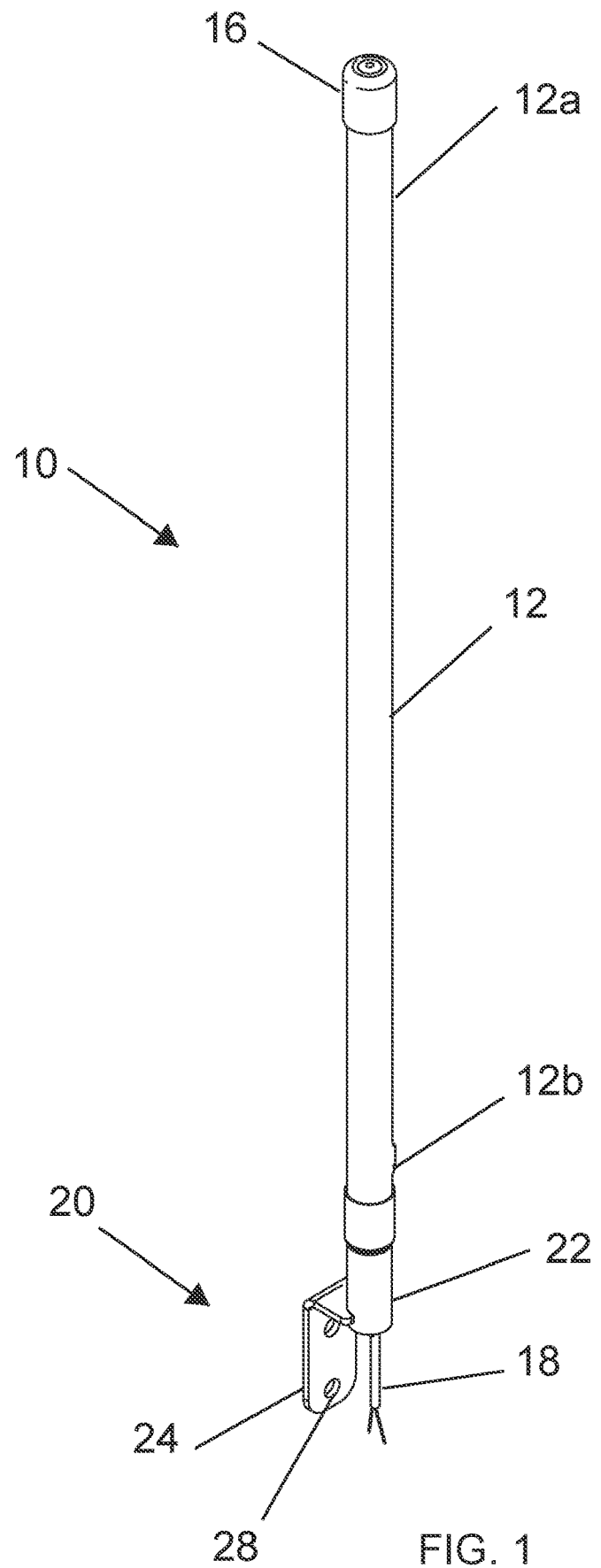
FIG. 1 is a perspective view depicting a plow marker in accordance with an exemplary embodiment of the present invention.

Reference is now made to the drawings wherein the showings are for purposes of illustrating embodiments of the article only and not for purposes of limiting the same, and wherein like reference numerals are understood to refer to like components.

Figure 2:
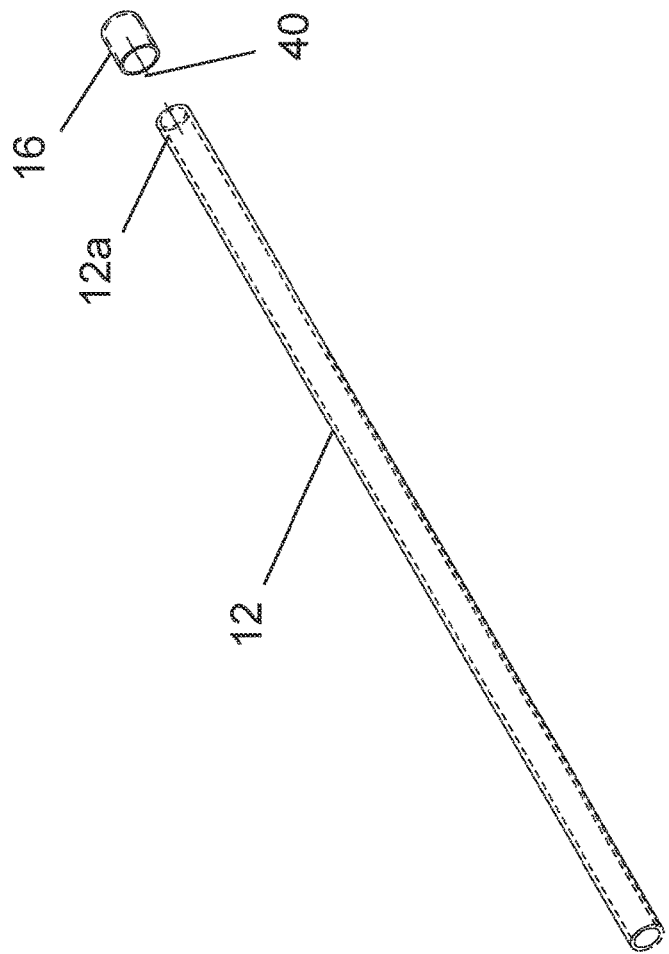
FIG. 2 is an exploded view of a plow marker in accordance with an exemplary embodiment of the present invention.
Figure 2:
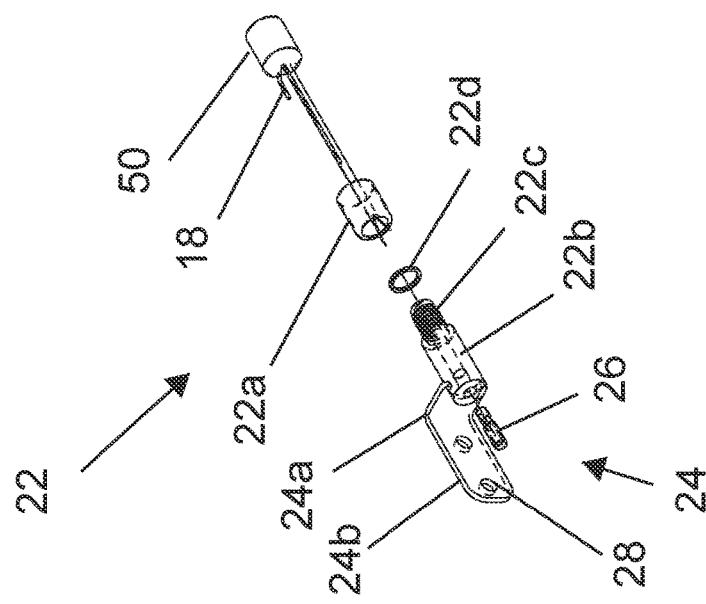

FIGS. 1 and 2 depict the illuminated marker 10 with mount 20 in accordance with an exemplary embodiment. An elongated tubular member 12 has a top end 12a and a bottom end 12b. The elongated tubular member 12 transmits at least a portion of light from an interior of the elongated tubular member 12. The elongated tubular member 12 is preferably formed of a durable plastic material. This plastic material can be transparent or translucent and be designed to allow a selected percentage of light transmission. The plastic material can include a selected pigment to impart a desired color scheme to the elongated tubular member 12. The elongated tubular member 12 is preferably hollow for retaining an illuminated member extending within the interior of the elongated tubular member 12 between the top and bottom ends 12a, 12b. The top end 12a is preferably enclosed by a cap 16 to protect the hollow interior and prevent moisture from entering therein. Conductor wiring 18 is used for connecting a source of electrical energy to the illuminated member, in accordance with principles that are well known and understood in the art.

With continued reference to FIGS. 1 and 2, the mount 20 includes an enclosing cap 22 that cooperates with a mounting bracket 24. The enclosing cap 22 is configured to be secured to the bottom end 12b of the elongated tubular member 12. The enclosing cap 22 also includes a hollow interior for admitting the conductor wiring 18 for connection to the source of electrical energy.

As shown in FIGS. 1 and 2, the mounting bracket 24 includes one or more mounting holes 28 for receiving respective bolt(s) 28a for connecting the mount 20 to the implement, preferably a snow plow blade. As shown in the indicated figures, two mounting holes 28 are configured to receive respective bolts and associated nuts, as would be understood by those skilled in the art. However, any number of holes 28 and bolts can be used without departing from the invention. The conductor wiring 18 can be connected to a source of electrical energy which is preferably an auxiliary power supply associated with the snow plow blade, as such aspects are well understood to those having skill in the art.

As depicted in FIGS. 1 and 2, the illuminated marker 10 and principal components thereof are configured to align with a longitudinal vertical axis 40. Specifically, the elongated tubular member 12 and the enclosing cap 22 are configured to be collinear along the longitudinal vertical axis 40 when assembled together into the illuminated marker 10. However, any alternative configuration of these components could also be contemplated without departing from the invention, such as providing an illuminated marker 10 and principal components thereof configured to align with a longitudinal horizontal axis.

With continued reference to FIG. 2, the mounting bracket 24 can be a perpendicular mounting bracket 24 as described in co-pending application entitled LED MARKER WITH VERTICAL MOUNT by the present inventor, the disclosure of which is hereby incorporated by reference. The perpendicular mounting bracket 24 has a horizontal mounting surface 24a and a vertical mounting surface 24b, where both of these surfaces 24a, 24b are formed together at a right angle. The horizontal mounting surface 24a is configured for connecting to a cylindrical end portion 22b of the enclosing cap 22 so that the elongated tubular member 12 is disposed in a substantially vertical position. The vertical mounting surface 24b is configured for connecting to a vertical portion of the implement, as described in detail in the aforementioned co-pending application.

As shown in FIG. 2, the cylindrical end portion 22b is formed integrally as one piece with the horizontal mounting surface 24a. A harness terminal connector 26 is provided for insertion into the cylindrical end portion 22b for routing power into the lighting element, as explained hereinbelow. The cylindrical end portion 22b of this embodiment also includes a threaded exterior portion 22c that is formed integrally together as one piece, for connecting to the crimped end portion 22a, and hollow for allowing passage therethrough of the conductor wiring 18. A washer 22d of nylon or similar material can also be provided for additional sealing.

As particularly shown in FIG. 2, the illuminated marker 10 includes a high lumen LED lighting element 50 mounted substantially adjacent to the bottom end 12b of the elongated tubular member 12 and configured to shine light vertically through the interior of the elongated tubular member 12 toward the top end 12a. In the preferred embodiment, the LED lighting element 50 is a single LED component. However, any suitable high lumen lighting element could optionally be implemented.

As indicated in FIGS. 1 and 2, the elongated tubular member 12 can be a diffuse, translucent member for omnidirectional scattering of light emitted from the high lumen LED lighting element 50. The elongated tubular member 12 is preferably formed of a durable plastic material, which can be hollow or solid. This plastic material can be transparent or translucent and be selected to allow a selected percentage of light transmission. The plastic material can include a selected pigment to impart a desired color scheme to the elongated tubular member 12. Alternatively, the plastic material can be clear and can receive a color imparted by the LED lighting element 50. A strobe controller can optionally be connected to enable blinking of the LED lighting element 50.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. An apparatus for marking an implement, comprising:
   an elongated illuminated member having top and bottom ends for transmitting at least a portion of light from an interior, for retaining at least one high lumen LED lighting element mounted substantially adjacent to the bottom end of the elongated illuminated member and configured to shine light through the interior of the elongated illuminated member toward the top end;
   conductor wiring for connection to a source of electrical energy to the elongated illuminated member;
   an enclosing cap including a crimped end portion configured to be secured to the bottom end of the elongated illuminated member, wherein the enclosing cap also including a cylindrical end portion having a hollow interior for admitting the conductor wiring for connection to the source of electrical energy, wherein the cylindrical end portion further comprises a threaded exterior portion formed integrally together as one piece, for connecting to the crimped end portion; and
   a mounting bracket including a first mounting surface configured for connecting to the cylindrical end portion of the enclosing cap so that the elongated illuminated member is disposed in a substantially vertical position, and wherein the mounting bracket also including a second mounting surface configured for connecting to the implement.

2. The apparatus of claim 1, wherein the second mounting surface comprises at least one mounting hole for receiving at least one respective bolt for connecting to the vertical portion of the implement.

3. The apparatus of claim 1, further comprising a longitudinal vertical axis, wherein the elongated illuminated member and the crimped end portion and the cylindrical end portion of the enclosing cap are collinear along the longitudinal vertical axis.

4. The apparatus of claim 1, wherein the elongated illuminated member comprises a diffuse, translucent member for omnidirectional scattering of light emitted from the high lumen LED lighting element.

5. The apparatus of claim 1, wherein the elongated illuminated member is formed of a durable plastic material, which is hollow or solid.

6. The apparatus of claim 1, wherein the elongated illuminated member is formed of a durable plastic material which is transparent or translucent and selected to allow a selected percentage of light transmission.

7. The apparatus of claim 1, wherein the elongated illuminated member is formed of a durable plastic material including a selected pigment to impart a desired color scheme to the elongated illuminated member.

8. The apparatus of claim 1, wherein the elongated illuminated member is formed of a durable plastic material that is clear for receiving a color imparted by the LED lighting element.

9. An apparatus for marking an implement, comprising:
   an elongated tubular member having top and bottom ends for transmitting at least a portion of light from an interior, for retaining a single high lumen LED lighting element mounted substantially adjacent to the bottom end of the elongated tubular member and configured to shine light through the interior of the elongated tubular member toward the top end;

conductor wiring for connection to a source of electrical energy to the elongated tubular member;

an enclosing cap including a crimped end portion configured to be secured to the bottom end of the elongated tubular member, wherein the enclosing cap also including a cylindrical end portion having a hollow interior for admitting the conductor wiring for connection to the source of electrical energy, wherein the cylindrical end portion further comprises a threaded exterior portion formed integrally together as one piece, for connecting to the crimped end portion; and a mounting bracket including a first mounting surface configured for connecting to the cylindrical end portion of the enclosing cap so that the elongated tubular member is disposed in a substantially vertical position, and wherein the mounting bracket also including a second mounting surface configured for connecting to the implement.

* * * * *